(12) United States Patent
Bamberg et al.

(10) Patent No.: US 9,302,351 B2
(45) Date of Patent: Apr. 5, 2016

(54) METHOD FOR JOINING AND JOINED CONNECTION OF TWO COMPONENTS MADE OF A METAL MATERIAL

(75) Inventors: Joachim Bamberg, Dachau (DE);
Roland Hessert, Markt Indersdorf (DE);
Wilhelm Satzger, Munich (DE);
Thomas Mack, Oberndorf (DE);
Alexander Gindorf, Arnbach (DE);
Martina Mack, Legal Representative, Oberndorf (DE)

(73) Assignee: MTU Aero Engines GmbH, Munich (DE)

( * ) Notice: Subject to any disclaimer, the term of this patent is extended or adjusted under 35 U.S.C. 154(b) by 1148 days.

(21) Appl. No.: 12/672,220

(22) PCT Filed: Jul. 24, 2008

(86) PCT No.: PCT/DE2008/001229
§ 371 (c)(1),
(2), (4) Date: May 24, 2010

(87) PCT Pub. No.: WO2009/018803
PCT Pub. Date: Feb. 12, 2009

(65) Prior Publication Data
US 2011/0126943 A1 Jun. 2, 2011

(30) Foreign Application Priority Data
Aug. 4, 2007 (DE) .......................... 10 2007 036 972

(51) Int. Cl.
| | | |
|---|---|---|
| B32B 15/01 | (2006.01) |
| B23K 31/02 | (2006.01) |
| B23K 13/01 | (2006.01) |
| B23K 20/12 | (2006.01) |
| C21D 1/26 | (2006.01) |
| C21D 6/00 | (2006.01) |
| C21D 7/06 | (2006.01) |
| C21D 7/12 | (2006.01) |

(52) U.S. Cl.
CPC ................. *B23K 31/02* (2013.01); *B23K 13/01* (2013.01); *B23K 20/129* (2013.01); *C21D 1/26* (2013.01); *C21D 6/001* (2013.01); *C21D 7/06* (2013.01); *C21D 7/12* (2013.01); *B23K 2201/001* (2013.01); *B23K 2203/08* (2013.01); *B23K 2203/18* (2013.01); *Y10T 428/12986* (2015.01)

(58) Field of Classification Search
CPC ....... B23K 13/01; B23K 20/129; B23K 31/02
USPC ......... 148/400, 527; 219/617; 228/112.1, 176
See application file for complete search history.

(56) References Cited

U.S. PATENT DOCUMENTS

| | | |
|---|---|---|
| 3,844,846 A | 10/1974 | Friske et al. |
| 4,379,745 A | 4/1983 | Polizzotti et al. |
| 6,217,824 B1 * | 4/2001 | Leczo et al. .................. 266/225 |
| 2005/0039511 A1 | 2/2005 | Prevey et al. |
| 2006/0067830 A1 | 3/2006 | Guo et al. |

FOREIGN PATENT DOCUMENTS

| | | |
|---|---|---|
| DE | 10 2004 058 146 A1 | 6/2006 |
| EP | 1 698 711 A1 | 9/2006 |
| JP | 03 082738 | 4/1991 |

* cited by examiner

Primary Examiner — Rebecca Lee
(74) Attorney, Agent, or Firm — Crowell & Moring LLP

(57) ABSTRACT

The invention relates to a method for joining two components (10, 12) made of a metal material, which are connected on two mutually associated joining surfaces (14, 16) by means of a joined connection, wherein at least one of the components (10) is strengthened in at least a partial region of the joining surface (14) thereof prior to joining. The invention further relates to a joined connection of two components (10, 12) made of a metal material.

20 Claims, 1 Drawing Sheet

METHOD FOR JOINING AND JOINED CONNECTION OF TWO COMPONENTS MADE OF A METAL MATERIAL

This application claims the priority of International Application No. PCT/DE2008/001229, filed Jul. 24, 2008, and German Patent Document No. 10 2007 036 972.9, filed Aug. 4, 2007, the disclosures of which are expressly incorporated by reference herein.

BACKGROUND AND SUMMARY OF THE INVENTION

The invention relates to a method for joining two components made of a metal material, in particular two components made of metal materials having a clearly different microstructure. The invention also relates to a joined connection of two components made of a metal material.

Numerous joining methods for connecting two components made of metal materials, particularly welding methods, are known from the prior art. In particular, if the materials are made of different metal materials, such as, for example, a forged alloy and a cast alloy, problems arise however in that there can be a relatively abrupt transition of the microstructures, of the moduli of elasticity, of the thermal expansion properties, of the internal stresses as well as of other material-specific characteristic values on the two corresponding joining surfaces of the two components. It is clear that this abrupt transition has had a disadvantageous effect thus far on the strength, testability and formation of internal stress, in particular in the region of the joining surfaces of the joined component.

For this reason, it is already known in principle from the prior art to connect the two components with one other indirectly with the intercession of a third component arranged in between them, wherein the component arranged in between them features transition values with respect to the structure and with respect to strength that lie between those of the components actually being connected. However, this method is extremely laborious, especially since two joined connections are created with possible imperfections.

Therefore, it is the objective of the present invention to create a method for joining as well as a joined connection of two components made of a metal material of the type mentioned at the outset, which can be used to connect the two components to one another in an improved manner.

In order to create a method that can be used to join the two components made of a metal material with one another in a considerably improved manner, the invention provides for at least one of the components to be strengthened and then heat treated in at least a partial region of the joining surface thereof prior to joining. As a result, an abrupt transition of the microstructure, of the modulus of elasticity, of the thermal expansion, of the formation of internal stress or of other characteristic values of the two materials being joined is mitigated in order to thereby achieve an improved connection between the two components made of a metal material and improved testability of the welded seam. The location of the joint and the location of the transition of the material structure are separated by achieving a deep-reaching, exponentially tapering-off microstructure under the corresponding joining surface induced by the strengthening method. As a result, the material pairing is testable and less critical in terms of its strength.

The aforementioned heat treatment is in particular of such a type that it causes a recrystallization. The strengthening can in particular be a deep-reaching strengthening.

The strengthening and subsequent heat treatment can for example be carried out once or several times in succession, and namely, in particular, as a function of the desired structure of the boundary layer structure.

To further refine the core structure of the cast component, the aforementioned method may be used several times in succession.

In a further embodiment of the invention, it has been shown to be particularly advantageous if the corresponding component is strengthened over its entire joining surface prior to joining. Thus, the desired, gradually tapering-off transition between the two partial materials of the components being joined is achieved over the entire joined connection, thereby separating the joining zone and the structural transition. Also considered within the scope of the invention is that both joining surfaces of the two components can be strengthened as the case may be.

In another embodiment of the invention, it has also been shown to be advantageous if the component is provided in the region of at least the strengthened partial region of the joining surface with an exponentially decreasing strengthening. This makes it possible for the desired structural transition to be formed especially advantageously.

It has been shown to be further advantageous if, after the strengthening, the component undergoes a heat treatment in the region of at least the strengthened partial region of the joining surface. This heat treatment can be applied to the entire component or only be carried out locally and close to the surface for example. A desirable microstructure is achieved through the heat treatment in particular in the region of the joint between the two joining surfaces in order to thereby achieve the desired less abrupt transition between the two components.

In this connection, it has been shown to be especially advantageous if the component undergoes a recrystallization by means of the heat treatment in the region of at least the strengthened partial region of the joining surface. This type of recrystallization achieves the desired microstructure in the region of the joint between the joining surfaces of the two components in an especially advantageous manner.

In a further embodiment of the invention, it has also been shown to be advantageous if at least the to-be-strengthened partial region of the joining surface of the one component is strengthened by shot peening, such as ultrasonic shot peening, and/or by surface rolling and/or by drifting and/or by laser shot peening and/or by shock-wave strengthening or by a combination of the strengthening methods. In this case, the advantage of this type of surface peening method is in particular that even with complex components or with complex joining surfaces, it is possible to achieve a deep-reaching strengthening. In addition, these types of surface peening methods are reproducible and very easy to control. It can be beneficial to stress the to-be-strengthened component mechanically and/or thermally simultaneously during strengthening.

As an alternative to this, another embodiment of the invention has shown it to be advantageous if the to-be-strengthened partial region of the joining surface is achieved by surface hardening, in particular in the form of an ultrasonic pulse strengthening. Such a sonopeen method can also be used in a simple manner for extremely complex joining surfaces, wherein an extremely uniform, deep-reaching and exponentially tapering-off strengthening can be achieved.

As an alternative to this, it would also be conceivable for at least the to-be-strengthened partial region of the joining surface to be strengthened by surface rolling. Such a method is extremely quick and cost-effective. However, also considered included in the scope of the invention is that instead of the previously described strengthening methods, other methods can also be used by means of which a strengthening of at least one of the components can be achieved mechanically in a partial region of the joining surface thereof.

The two components made of a metal material can also be connected to one other especially advantageously by a welded connection. In this case, inductive high-frequency pressure welding in particular has been shown to be advantageous, because this makes it possible to achieve an extremely durable and permanent connection of the two components. But other welding methods, such as, for example, friction welding, are conceivable.

The advantages described above in connection with the method according to the invention also apply in a similar manner to the joined connection.

Additional advantages, features and details of the invention are yielded from the following description of a preferred exemplary embodiment as well as on the basis of the drawings.

DETAILED DESCRIPTION OF THE DRAWINGS

Figure 1:
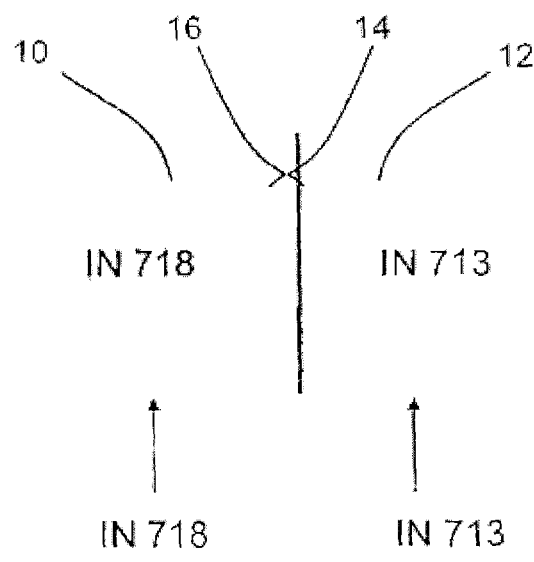
FIG. 1 is a schematic sectional view through two components made of a metal material, which are connected on two mutually associated joining surfaces by means of a joined connection in a method according to the prior art.
Figure 2:
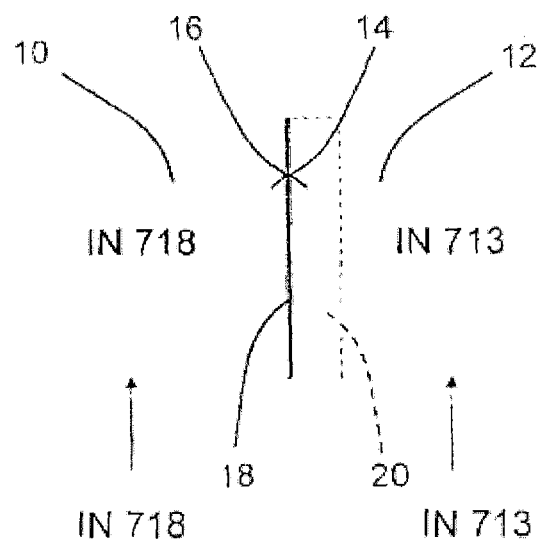
FIG. 2 is another schematic sectional view through two components made of a metal material, which are connected on two mutually associated joining surfaces by means of a joined connection, wherein the structure of one of the components was adapted in at least a partial region thereof prior to joining.

FIGS. 1 and 2 each depict a schematic sectional view of two components 10, 12 made of a metal material, which are connected on two mutually associated joining surfaces 14, 16 by means of a joined connection, which will be explained in still greater detail in the following. Whereas the two components 10, 12 according to FIG. 1 are joined using a method according to the prior art, the method according to the invention explained in further detail below was used in the case of the components 10, 12 according to FIG. 2.

In the present case, the two components 10, 12 are made of an IN718 forged alloy as well as of an IN713 cast material. Because of the different metal materials, joining the two components 10, 12 has till now produced the problem that there is an abrupt transition of the microstructures, the moduli of elasticity, the thermal expansions, the internal stresses and other material-specific characteristic values in the region of the joined connection between the two joining surfaces 14, 16.

For this reason, the present method for joining the two components 10, 12 in accordance with FIG. 2 provides for the component 12, which is made of the IN713 cast material, to be strengthened mechanically by a surface hardening method prior to joining the two components 10, 12 in the region of the joining surface 16 thereof.

This type of surface hardening method is already known for example from German Patent Document No. DE 10 2004 058 146 A1, whose content is herewith expressly incorporated by reference. The surface hardening method in that document is also designated as the sonopeen method, in which a tool is excited with, for example, ultrasonic frequency, and the respective surface of the component is strengthened by hammering movements.

As an alternative to the surface strengthening method described above, processing the respective joining surface 16 by shot peening and ultrasonic shot peening would also be conceivable. In the case of an alternative method, it would also be conceivable for the joining surface 16 of the component 12 to be strengthened by surface rolling. Also considered within the scope of the invention is that naturally other processing methods that can be used to strengthen the desired region of the component 12 mechanically would also be conceivable.

By using the surface hardening methods described above, a deep-reaching, exponentially tapering-off strengthening is introduced under the joining surface 16 or the component 12. This produces a modification of the material properties, which can be expressed in particular in a modified microstructure, a modified modulus of elasticity, a modified thermal expansion, a modified internal stress and other mechanical material properties.

Also considered within the scope of the invention is that just a partial region of the joining surface 16 could be strengthened provided that a qualitatively adequate joined connection can be achieved hereby. In the present exemplary embodiment according to FIG. 2, the component 12 is strengthened with the IN713 cast material over its entire joining surface 16 prior to joining.

After strengthening, the component 12 undergoes a heat treatment in a further step of the process in the area of at least the strengthened partial region of the joining surface 16. In this case, the component 12 is treated close to the surface or locally. The properties of the component 12 in the strengthened region of the joining surface 16 are adapted hereby in a targeted manner. In particular, a heat treatment is undertaken in this case in which a controlled recrystallization of the component 12 made of the IN713 cast material is carried out.

Following the strengthening or cold forming and the heat treatment, the joining of the two components 10, 12 can be carried out in a third step of the process. The joining of the two components 10, 12 made of metal materials is carried out in the present case by a welded connection in the form of inductive high-frequency pressure welding. To this end, the two components 10, 12 are surrounded by a suitable inductor, for example in the region of the joints 14, 16, and this inductor is acted upon via an electrical connection with a high-frequency alternating current with a preferably adjustable frequency. The inductor induces high-frequency alternating currents on the edges of the two components 10, 12 in the region of the joining surfaces 14, 16, and these alternating currents heat and plasticize the edges of the components. As soon as they are adequately plasticized, an axial compression stroke is carried out by a corresponding compression device, which compresses the two components 10, 12. In this case, the inductor current or welding current can be switched off at a suitable point in time before, during or after the compression stroke.

FIG. 2, which depicts the two components 10, 12 after welding, schematically indicates that a joining zone 18 between the two joining surfaces 14, 16 and a structural transition 20 (indicated by a dashed line) are separated from one another because of the strengthening and recrystallization that were carried out. In addition, the transition between the components 12, 10 or from the forged structure to the cast structure tapers off gradually, i.e., is not sharply localized. As a result, the material pairing is testable and less critical in terms of strength.

The invention claimed is:

1. A joined connection of two components made of a metal material, comprising:
   a joining surface of a first component, wherein the joining surface is strengthened and heat treated in at least a partial region of the joining surface;
   a joining surface of a second component; and
   a joined connection that connects the joining surface of the first component and the joining surface of the second component;
   wherein the first component is provided in the strengthened partial region with an exponentially decreasing strengthening;
   and wherein the first component is a cast material and the second component is a forged alloy.

2. The joined connection according to claim 1, wherein the first and second components have a different microstructure.

3. The joined connection according to claim 1, wherein the first component is strengthened over an entire region of the joining surface.

4. The joined connection according to claim 1, wherein after the strengthening, the first component undergoes a heat treatment in a region of at least the strengthened partial region.

5. The joined connection according to claim 1, wherein the first component undergoes a recrystallization by the heat treatment.

6. The joined connection according to claim 1, wherein the strengthening is performed by shot peening or by ultrasonic shot peening.

7. The joined connection according to claim 1, wherein the strengthening is performed by surface hardening.

8. The joined connection according to claim 1, wherein the strengthening is performed by surface rolling.

9. The joined connection according to claim 1, wherein the joined connection is a weld connection.

10. The joined connection according to claim 1, wherein the joined connection is an inductive high-frequency pressure weld or a friction weld.

11. A method for joining two components made of a metal material according to claim 1, comprising the steps of:
    strengthening a first component in at least a partial region of a joining surface thereof;
    heat treating the strengthened partial region of the first component; and
    connecting the joining surface of the first component to a joining surface of a second component by a joined connection;
    wherein the first component is provided in the strengthened partial region with an exponentially decreasing strengthening.

12. The method according to claim 11, wherein the first and second components have a different microstructure.

13. The method according to claim 11, wherein the first component is strengthened over an entire region of the joining surface.

14. The method according to claim 11, wherein after the strengthening, the first component undergoes a heat treatment in a region of at least the strengthened partial region.

15. The method according to claim 11, wherein the first component undergoes a recrystallization by the heat treatment.

16. The method according to claim 11, wherein the strengthening is performed by shot peening or by ultrasonic shot peening.

17. The method according to claim 11, wherein the strengthening is performed by surface hardening.

18. The method according to claim 11, wherein the strengthening is performed by surface rolling.

19. The method according to claim 11, wherein the joined connection is a weld connection.

20. The method according to claim 11, wherein the joined connection is an inductive high-frequency pressure weld or a friction weld.

\* \* \* \* \*